United States Patent [19]
Morrison et al.

[11] Patent Number: 4,670,637
[45] Date of Patent: Jun. 2, 1987

[54] METHOD AND APPARATUS FOR TRANSMITTING A LASER SIGNAL THROUGH FOG

[75] Inventors: Clyde A. Morrison, Wheaton; Nick Karayianis; Donald E. Wortman, both of Rockville, all of Md.

[73] Assignee: The United States of America as represented by the Secretary of the Army, Washington, D.C.

[21] Appl. No.: 700,210

[22] Filed: Feb. 11, 1985

[51] Int. Cl.[4] .............................................. B23K 26/00
[52] U.S. Cl. ..................... 219/121 L; 219/121 LM; 219/121 LA; 356/335; 250/474.1
[58] Field of Search .... 219/121 L, 121 LM, 121 LA, 219/121 LZ; 250/574, 474.1, 393; 356/318, 335, 330

[56] References Cited

U.S. PATENT DOCUMENTS 4,211,487  7/1980  Morrison et al. .................... 356/336

OTHER PUBLICATIONS

Encyclopedia Brittanica (1957) "Fog", vol. 9, pp. 436-438.
Glicker, "Propagation of a 10.6-μ Laser Through a Cloud Including Droplet Vaporization", Appli. Optics, vol. 10, No. 3, Mar. 1979, pp. 644-650.
Morrison et al, "The Extended Rayleigh Theory of the Oscillation of Liquid Droplets", J. Fluid Mech. (1981) vol. 104, pp. 295-309.
Barber and Wang, "Rayleigh-Gans-Debye Applicability to Scattering by Nonspherical Particles, Applied Optics; vol. 17, No. 5, Mar. 1970, pp. 797-803.
Jackson, "Classical Electrodynamics", John Wiley and Sons, Inc. 1963 pp. 202-205.
Billings et al, "Vibrating Water Drops in Electric Fields", J. Geophys. Res. vol. 74, No. 28, Dec. 20, 1969, pp. 6881-6886.
Brook et al, "Fluctuating Radar Echo: Modulation by Vibration Drops", J. Geophys. Res. vol. 73, No. 22, Nov. 1968, pp. 7137-7144.
O'Konski et al, "The Distortion of Aerosol Droplets by an Electric Field", J. Phys. Chem. vol. 56 (Dec. 1953), pp. 955-958.
Brazier-Smith et al, "The Vibration of Electrified Water Drops", Proc. Roy. Soc. A vol. 322, pp. 523-534 (1971).
Wortman, Report No. HDL-TR-1878, "Possible Use of Two Laser Beams to Determine Particle-Size Distribution, Jan. 1979.
Taylor, "Disintegration of Water Drops in an Electric Field", Proc. Roy. Soc. London A vol. 280 (1964) pp. 383-397.

*Primary Examiner*—M. H. Paschall
*Attorney, Agent, or Firm*—Saul Flbaum; Thomas F. McDonald; Anthony T. Lane

[57] ABSTRACT

A method and apparatus for transmitting laser signals through fog, in which a laser signal directed into the fog is amplitude modulated at one or more resonant frequencies of the water droplets forming the fog at such strength as to cause the droplets to burst, thereby decreasing the scattering of the laser signal and increasing the transmission of this signal through the fog.

7 Claims, 3 Drawing Figures

4,670,637

METHOD AND APPARATUS FOR TRANSMITTING A LASER SIGNAL THROUGH FOG

RIGHTS OF THE GOVERNMENT

The invention described herein may be manufactured, used, and licensed by or for the United States Government for governmental purposes without payment to us of any royalty thereon.

BACKGROUND OF THE INVENTION

The invention relates to a method and apparatus for increasing the transmission of a laser signal through a fog.

The problem of "seeing through" fog has been a persistent difficulty. A number of techniques have been employed in the past to disperse fog or shift to very long wavelengths (far infared or microwaves) to reduce the scatter created by fog droplets. Another method of penetrating fog has been to use very high laser light power to evaporate the fog droplets and reduce the particle size, thereby reducing the scatter in the path of the laser beam. Such a technique is quite costly due to amount of energy consumed by the evaporation process. The shift to microwave frequencies avoids the problem but at a tremendous loss in resolving power of the object being detected.

SUMMARY OF THE INVENTION

Accordingly, it is a primary object of the invention to provide a novel method and apparatus for transmitting laser signals through fog.

It is another object of the invention to provide a method and apparatus for transmitting laser signals through fog, which requires less power and is therefore more efficient than other proposed or actual methods and apparatus for this purpose.

In the method and apparatus described herein, a laser signal directed into the fog is amplitude modulated at one of the resonant frequencies of the water droplets forming the fog at such strength as to cause the droplets having this resonant frequency to burst, thereby decreasing the scattering of the laser signal and increasing the transmission of this signal through the fog. When the size and distribution of the fog droplets is known, the modulation frequency can be varied over a frequency range so as to cause most of the fog droplets to burst. Where the size and distribution of the fog droplets is not known, the modulation frequency can be varied over a frequency range corresponding to the range and size within which most fog droplets fall. For the same increase in laser signal transmission, the amount of energy required to dissipate the fog by bursting the fog droplets is many orders of magnitude smaller than that required to dissipate the fog by partially vaporizing the fog droplets. Also, since the resonant frequency of fog droplets lie within a sonic and ultrasonic range (10 kHz to 10 MHz), amplitude modulation of the laser signal is easily obtained by existing conventional techniques.

BRIEF DESCRIPTION OF THE DRAWINGS

The invention will be better understood, and further objects, features and advantages thereof will become more apparent from the following description of preferred embodiments, taken in conjunction with the accompanying drawings in which.

DESCRIPTION OF PREFERRED EMBODIMENTS

Figure 1:
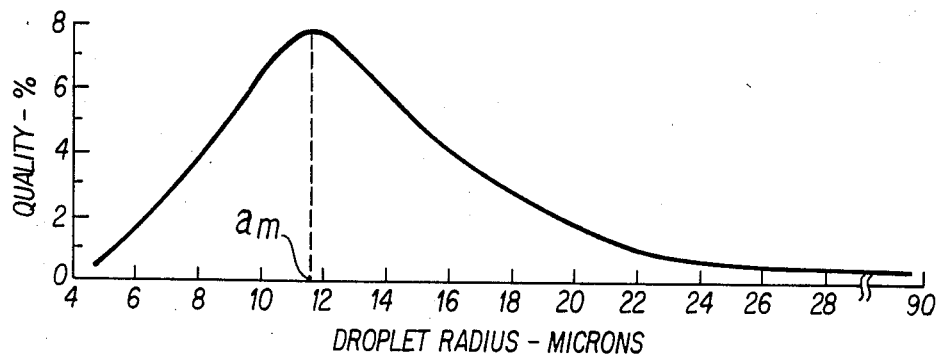
FIG. 1 is a histogram of droplet size in a typical liquid-droplet fog.

A fog is a multitude of particles, usually water droplets, suspended in air which reduce visibility to less than one kilometer. Fogs generally produce very little or no precipitation, and are thus said to be colloidally stable, that is, there is no marked tendency within them for the size of some of the droplets to grow rapidly at the expense of the other drops. Fogs are characterized by relatively small size drops, predominately much less than 100 microns in diameter. The concentration of droplets in fog rarely exceeds 100 per cubic centimeter, and the liquid water contents are usually of the order of hundredths of a gram per cubic meter and less. The radius of most fog droplets is between two and eighteen microns. A characteristic feature of the fog droplet size-distribution is the existence of a maximum for some droplet radius $a_m$, as shown in FIG. 1.

If an electric field E is applied to a water drop in free space, the drop will expand along the direction of the field E. If the direction of the field is reversed, the drop still expands along the field. Thus, the force F on the drop is proportional to the square of the electric field E, or $$F = KE^2 \qquad (1)$$

where K is a constant dependent on geometry, dielectric constant, etc.

If an amplitude modulated laser beam is utilized to generate the electric field E, the average force $\overline{F})/$ on the water drop over the period of the laser frequency $T_L$, which is very short compared to the period of the amplitude modulation, is given by the following relationship, $$\overline{F(t)} = \frac{1}{T_L} \int_0^{T_L} F(t) dt = K \overline{E^2(t)} \qquad (2)$$

If the electric field E of equation 1 is selected as $$E(t) = E_o \cos \omega t [1 + \epsilon_M \cos \omega_M t] \qquad (3)$$

where $\omega$ is the frequency of the laser, $\omega_M$ is a modulation frequency ($\omega_M >> \omega$), and $\epsilon_M$ is the depth of modulation, then $$\overline{E^2(t)} = \frac{E_o^2}{2} \left[ 1 + \frac{\epsilon_M^2}{2} + 2\epsilon_M \cos \omega_M t + \frac{\epsilon_M^2}{2} \cos 2\omega_M t \right] \qquad (4)$$

If this value of $E^2(t)$ is used in Equation (2), then $$\overline{F(t)} = K \frac{E_o^2}{2} \left[ 1 + \frac{\epsilon_M^2}{2} + 2\epsilon_M \cos \omega_M t + \frac{\epsilon_M^2}{2} \cos 2\omega_M t \right] \qquad (5)$$

Thus, it is seen that the force F(t) on the water drop will contain the modulation frequency $\omega_M$ along with twice the modulation frequency $2\omega_M$ as well as a constant term K.

If an amplitude modulated laser beam, such as produced by a $CO_2$ laser, is used to generate the electric field given by equation 3 above, and if water drops of uniform size are immersed in this field, the water drops then resonate when the modulation frequency $\omega_M$ of the electric field E(t) matches the mechanical resonant frequency $\omega_n$ of the droplets, which is derived by Lord Rayleigh and is defined as follows:

$$\omega_n = \sqrt{\frac{n(n-1)(n+2)\tau}{\rho a^3}} \quad (6)$$

where n is the resonance mode number, $\tau$ is surface tension, $\rho$ is the density and a is the drop radius. Thus for the dominant oscillation mode (n=2), $$\omega_2 = \sqrt{\frac{8\tau}{\rho a^3}}$$

As shown in Equation (5), the strength of the force acting on the water droplets will depend on the power in the laser beam through the factor $E^2$. If the power in the laser beam is high enough, the drops will break and reduce the scattering of the laser beam. This reduction of scattering can be shown quite simply by using the Rayleigh formula for the scattering cross section, $\sigma$, as follows:

$$\sigma = A\, a^6/\lambda^4 \quad (7)$$

where $A=160\pi^5\delta^2/3 (\delta=(\epsilon-1)/(\epsilon+2)$, $\epsilon$ is the dielectric constant), a is the drop radius and $\lambda$ is the wavelength of the laser light. The attenuation I of a beam of light traveling through a length, L, of the fog particles is given by $$I = I_o e^{-\Gamma_o L} \quad (8)$$

where $\Gamma_o = N_o \sigma$ with $\sigma$ being given by equation (7) and $N_o$ being the number of droplets per unit volume. Thus if all the droplets were broken in half, their new radius would be $a/2^{\frac{1}{3}}$ but their number would be doubled, so that the new attenuation coefficient, $\Gamma$, would be $\Gamma = \Gamma_o/2$.

Since the stored energy of each droplet, $W_s$, associated with the surface tension, $\lambda$, ($\lambda = 72.75$ dynes/cm for water at 20° C.) is $$W_s = 4\pi\gamma a^2 \quad (9)$$

then the final surface energy W' for the resultant two drops is $$W_s' = 2^{\frac{1}{3}} W_s \quad (10)$$

Or $\Delta W_s = [2^{\frac{1}{3}} - 1] 4\pi\gamma a^2$
and this increase in energy $\Delta W_s$ must be supplied by the laser beam.

If the reduction in drop size is accomplished by evaporating the drops to reduce the attenuation coefficient by the same amount ($\Gamma_o/2$), from equations (7) and (8) the required size of the final drop will be $a/2^{1/6}$, assuming the number of particles remain constant during the evaporation process. The energy $\Delta W_v$ which will have to be supplied by the laser beam will then be $$\Delta W_v = \frac{4\pi}{3}\left[1 - \frac{1}{\sqrt{2}}\right] \rho L_o a^3 \quad (11)$$

where $\rho$ is the density and $L_o$ is the latent heat of vaporization (for water $L_o = 540$ calorie/gram or 2259.36 joules/gram). Using the values $\gamma = 72.75$ dynes/cm and $L_o = 2259.36$ joules/gram in equations (10) and (11), $$\Delta W_s = 2.376 \times 10^{-5} a^2 \text{ joules} \quad (12)$$

$$\Delta W_v > 2.772 \times 10^3 a^3 \text{ joules} \quad (13)$$

if a is measured in cm.

Using equations (12) and (13), the amount of energy required to reduce the scattering by identical factors for a 1 micron drop of water is $$W_s \approx 2.38 \times 10^{-13} \text{ joule}$$

and $$W_v \approx 2.77 \times 10^{-9} \text{ joule}$$

Similarly, the amount of energy required to reduce the scattering by identical factors for a 100 micron drop of water is $$\Delta W_s \approx 2.38 \times 10^{-9} \text{ joule}$$

and $$\Delta W_v \approx 2.77 \times 10^{-3} \text{ joule}$$

Thus, it is seen that in any practical region of drop size the amount of energy required to dissipate the fog is many orders of magnitude smaller if the droplets are broken as compared to vaporized.

Figure 2:
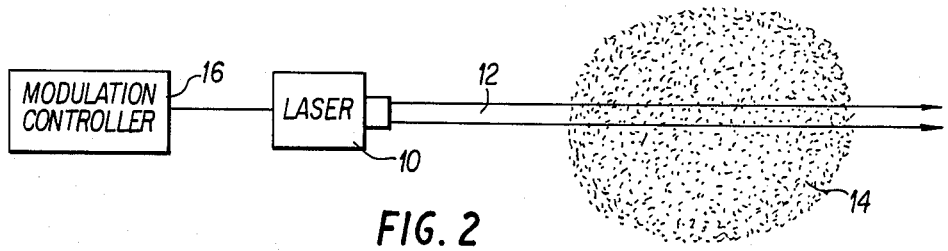
FIG. 2 is a schematic block diagram of a first embodiment of the invention.

In the embodiment of FIG. 2, a high power laser 10, such as a $CO_2$ laser, generates a laser beam 12 which is directed into a fog 14. The laser beam 12 is modulated by a modulation controller 16 at at least one of the resonant frequencies of the water droplets forming the fog at such strength as to cause bursting of the fog droplets whose mechanical resonant frequency corresponds to the modulation frequency. Preferably, the modulation frequency will be swept over a range of frequencies so as to burst most of the droplets forming the fog. For example, since the radius of most droplets in a fog is between two and eighteen microns, the modulation frequency can be continuously swept from $1.35 \times 10^6$ Hz to $50.0 \times 10^3$ Hz, corresponding to the mechanical resonant frequencies of 18 micron radius and 2 micron radius water droplets, respectively. In this way, most of the droplets forming a fog will be split one or more times into droplets having a radius of less than 2 microns. Where the droplet size-distribution of the fog is known, the frequency range over which the modulation frequency is swept can be accurately set so that most of the fog droplets are burst one or more times to thus reduce the average droplet size and increase the transmission of the laser beam 12 through the fog 14.

Figure 3:
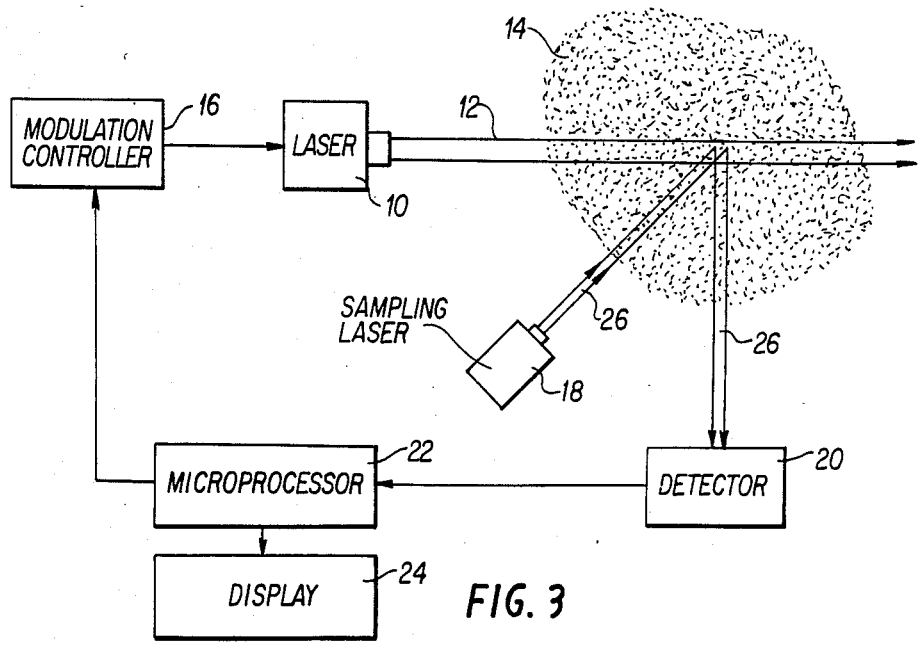
FIG. 3 is a schematic block diagram of a second embodiment of the invention.

In the embodiment of the invention shown in FIG. 3, the fog droplet size-distribution is determined in accordance with the method and apparatus described in our U.S. Pat. No. 4,211,487, issued July 8, 1980, which is hereby included herein by reference. In addition to the high power laser 10 and the modulation controller 16, this preferred embodiment includes a sampling laser 18, a scattered beam detector 20, a microprocessor 22, and a display 24. The modulation frequency of the laser beam 12 produced by the laser 10 is selectively variable over a predetermined frequency range, as determined by the microprocessor 22 controlling the modulation controller 16. The system in FIG. 3 is operated in a first mode to determine the droplet size-distribution, and thereafter in a second mode to disperse the fog along the path of the laser beam 12.

In the first mode of operation, the laser 10 is operated to generate an amplitude modulated laser signal having sufficient strength to cause droplets in the laser path having a resonant frequency corresponding to the modulation frequency to resonantly elongate and contract. The mechanically oscillating droplets present varying reflective surfaces to the impinging sampling laser beam 26, which results in a varying intensity for a reflected sampling laser beam. Thus, the intensity of the reflected sampling laser beam is in turn modulated by the resonating droplets. The modulation component of the reflected sample laser beam 26 is monitored by the detector 20. Assuming that each resonating droplet, regardless of size, contributes an identical amount to the detected modulation component, a quantitative measure of the number of droplets of a particular size is provided at each modulation frequency $\omega_M$. This quantitative measure is produced by the microprocessor 22, as data for each modulation frequency $\omega_M$ is obtained, and a size-distribution profile is obtained.

In a second mode of operation, the field $E_o$ and/or the depth of modulation $\epsilon_M$ is increased so that droplets in the path of the laser beam having the same mechanical resonant frequency $\omega_n$ as the modulation frequency ωhd M will mechanically elongate and burst into smaller droplets. The modulation frequency range is determined by the microprocessor 22. For example, for the typical droplet size-distribution shown in FIG. 1, the modulation frequency could be varied by the microprocessor 22 between $25.8 \times 10^3$ Hz corresponding to a droplet radius of 28 microns, and a frequency of $478 \times 10^3$ Hz corresponding to a droplet radius of 4 microns. Alternatively, the droplet size-distribution could be observed by an operator at the display 24, and the modulation frequency selected and varied manually by the operator during the second mode operation of the apparatus.

For the purpose of example, a $CO_2$ high-power linearly-polarized, amplitude-modulated cw laser can be used for the laser 10, and a He-Ne cw laser can be used for the sampling laser 18.

Since there are many variations, modifications, and additions to the specified embodiments of the invention described herein which would be obvious to one skilled in the art, it is intended that the scope of the invention would be limited only by the appended claims.

What is claimed and desired to be secured by Letters Patent of the United States is:

1. A method of transmitting a laser signal through a fog of liquid droplets, comprising the steps of:

generating a continuous unidirectional laser signal in the form of a laser beam at a laser carrier frequency ω;

modulating the amplitude of the laser beam at at least one modulation frequency $\omega_M$ which is much less than the carrier frequency ω and which is equal to one of the expected mechanical resonant frequencies of the droplets forming the fog, wherein the amplitude-modulated laser signal generates a unidirectional electric field along the laser beam path which is defined by the relationship $$E(t) = E_o \cos \omega t \ (1 + e_M \cos \omega_M t)$$

where $E_o$ is the peak amplitude of the electric field which is a function of the maximum power density of the laser beam, and $e_M$ is the depth of modulation of of the electric field which is a function of the depth of modulation of the laser beam, the power density and modulation depth of the laser beam being selected such that the force acting on liquid droplets disposed in the laser beam path as a result of the electric field is sufficient to cause droplets having a mechanical resonant frequency $\omega_M$ to burst; and directing the amplitude-modulated laser beam into the fog, whereby the electric field generated by the laser beam causes liquid droplets disposed in the laser beam path and having a mechanical resonant frequency equal to the modulation frequency $\omega_M$ to burst, decreasing the scattering of the laser beam and increasing the transmission of the laser signal through the fog.

2. A method, as described in claim 1, wherein the step of modulating the amplitude of the laser beam comprises the further step of varying the modulation frequency over a frequency range corresponding to the expected range of sizes of most of the droplets forming the fog.

3. A method, as described in claim 1, which further comprises a first step of determining the size and distribution of the droplets forming the fog.

4. A method, as described in claim 3, wherein the step of modulating the amplitude of the laser beam comprises the further step of varying the modulation frequency over a frequency range corresponding to the range of sizes of most of the droplets forming the fog.

5. Apparatus for transmitting a laser signal through a fog of liquid droplets, comprising;

signal generating means for generating a continuous unidirectional laser signal at a laser carrier frequency ω in the form of a laser beam directed into the fog; and signal modulating means for modulating the amplitude of the laser beam at least one modulation frequency $\omega_M$ which is much less than the carrier frequency ω and which is equal to one of the mechanical resonant frequencies of the droplets forming the fog, wherein the amplitude-modulated laser signal generates a unidirectional electric field along the laser beam path which is defined by the relationship $$E(t) = E_o \cos \omega t \ (1 + e_M \cos \omega_M t)$$

where $E_o$ is the peak amplitude of the electric field which is a function of the maximum power density of the laser beam, and is $e_M$ is the depth of modulation of the electric field which is a function of the depth of modulation of the laser beam, the power density and modulation depth of the laser beam being selected such that the force acting on liquid droplets disposed in the laser beam path as a result of the electric field is sufficient to cause droplets having a mechanical resonant frequency 24 $\omega_M$ to burst, decreasing the scattering of the laser beam and increasing the transmission of the laser signal through the fog.

6. Apparatus, as described in claim 5, wherein the signal modulating means comprises means for varying the modulation frequency $\omega_M$ over a preselected range of frequencies.

7. Apparatus, as described in claim 6, which further comprises measuring means for determining the size and distribution of the droplets forming the fog.

* * * * *